United States Patent [19]

Stuber

[11] 4,198,743
[45] Apr. 22, 1980

[54] METHOD FOR FORMING A MAGNETIC CORE FOR A LINEAR COMPRESSOR

[75] Inventor: Richard A. Stuber, Ann Arbor, Mich.

[73] Assignee: Tecumseh Products Company, Tecumseh, Mich.

[21] Appl. No.: 924,614

[22] Filed: Jul. 14, 1978

Related U.S. Application Data

[63] Continuation-in-part of Ser. No. 893,873, Apr. 6, 1978, which is a continuation of Ser. No. 738,708, Nov. 4, 1976, which is a continuation of Ser. No. 507,538, Sep. 19, 1974, abandoned.

[51] Int. Cl.² .................................. H02K 15/02
[52] U.S. Cl. ............................. 29/596; 29/605; 29/609; 310/15; 310/30
[58] Field of Search .................. 29/596, 605, 609; 310/23, 24, 30 X, 34, 35, 15 X, 216–218; 417/416–418

[56] References Cited

U.S. PATENT DOCUMENTS

| | | | |
|---|---|---|---|
| 2,906,977 | 9/1959 | Rowley et al. | 336/68 |
| 2,968,087 | 1/1961 | Thompson et al. | |
| 3,542,495 | 11/1976 | Barthalon | 417/416 |
| 3,955,272 | 5/1976 | Hallerback | 29/596 |

FOREIGN PATENT DOCUMENTS 841351 1/1940 France.
1574145 7/1969 France.

Primary Examiner—Carl E. Hall
Attorney, Agent, or Firm—Albert L. Jeffers

[57] ABSTRACT

A method for forming a magnetic core for the magnetic circuit of a linear-motor compressor suitable for use in a refrigerant system. The compressor includes a conical armature which reciprocates in a complementary air-gap under the influence of an electromagnetic circuit and a pair of linear complementary return springs connected to the armature between the compressor piston and outboard bearing. The electromagnetic circuit includes a pair of abutting convoluted loops of spirally wound magnetic strip material with a conical air-gap fabricated in the area of abutment. The magnetic core is formed by forming a pair of stacks of magnetic strips having diverse lengths, bending each stack to form a generally C-shaped core section having a generally semi-circular air-gap space defined by the ends of the strips, fastening the C-shaped stacks in opposed abutment to form a generally cylindrical air-gap, and then machining the air-gap into the desired conical shape.

7 Claims, 27 Drawing Figures

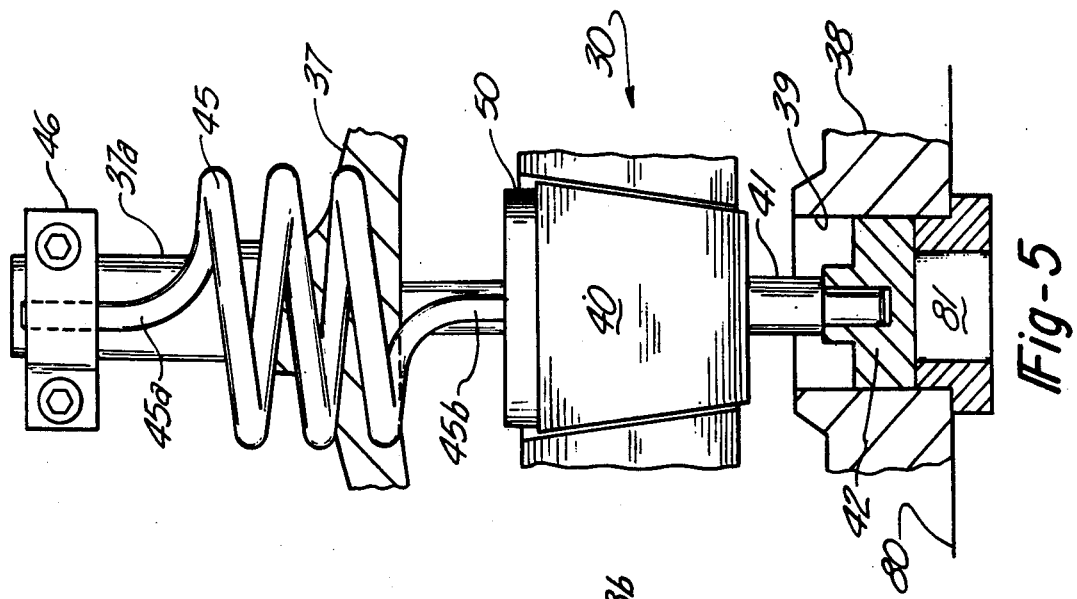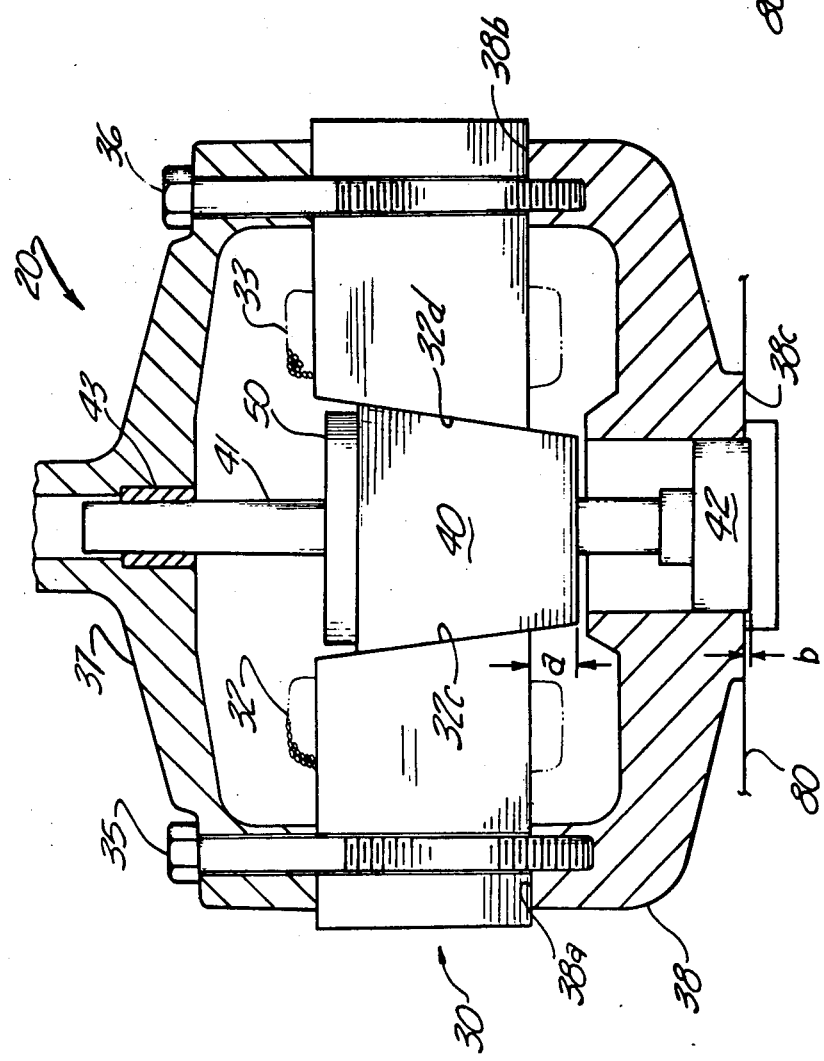

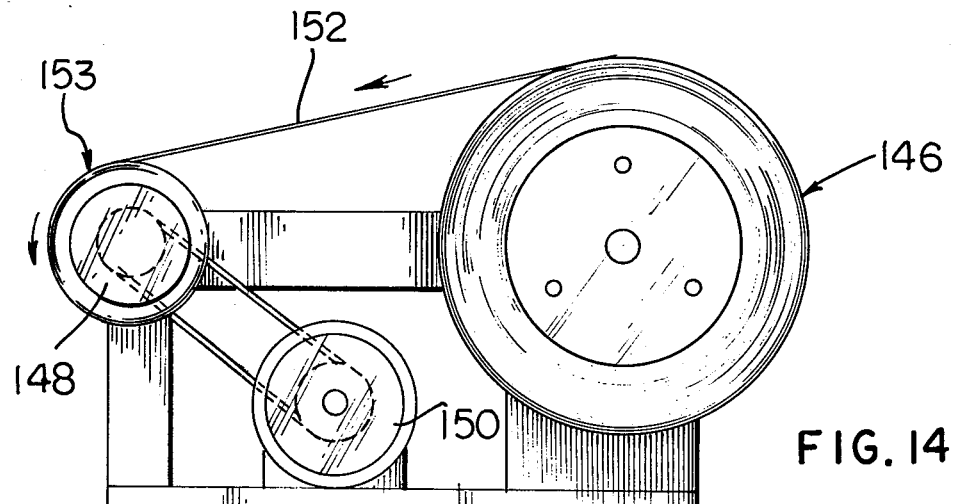
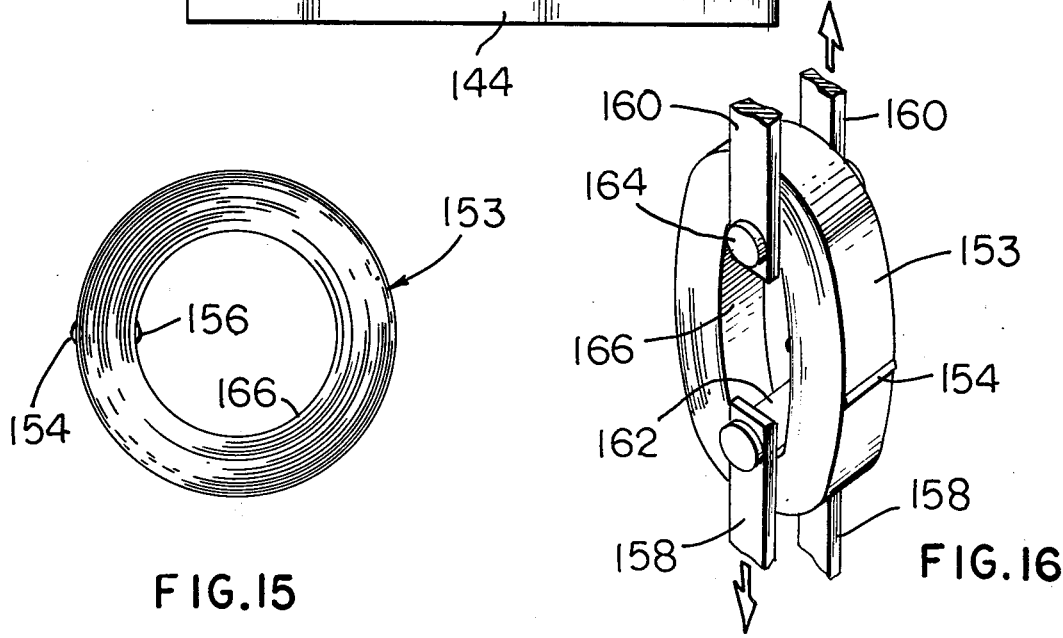
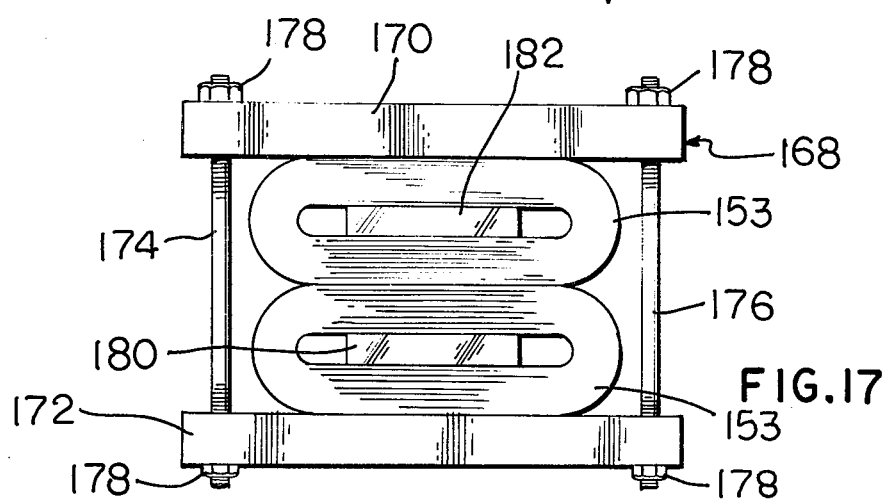

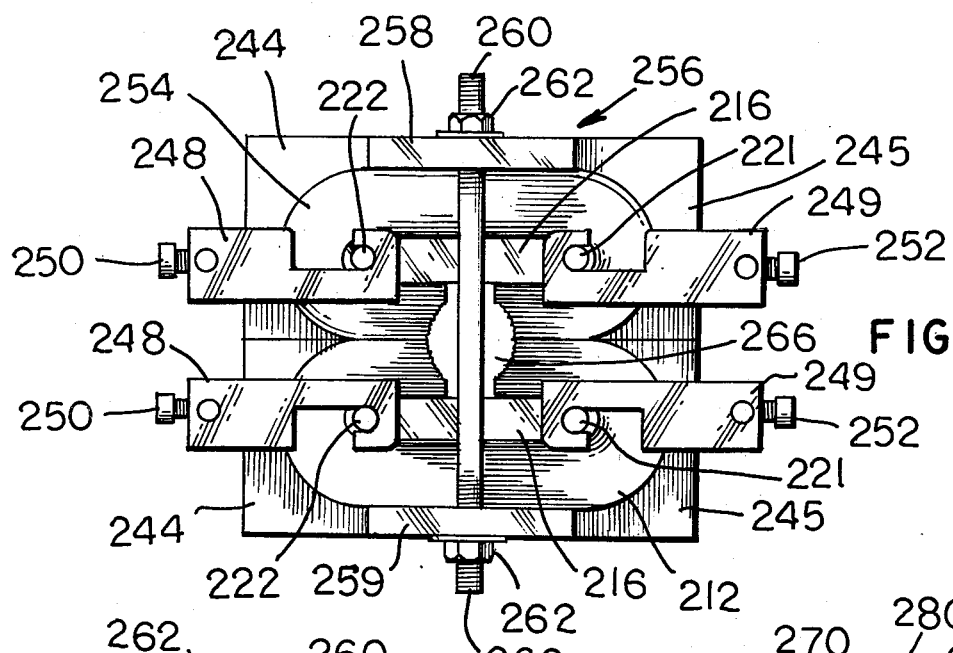
FIG. 24
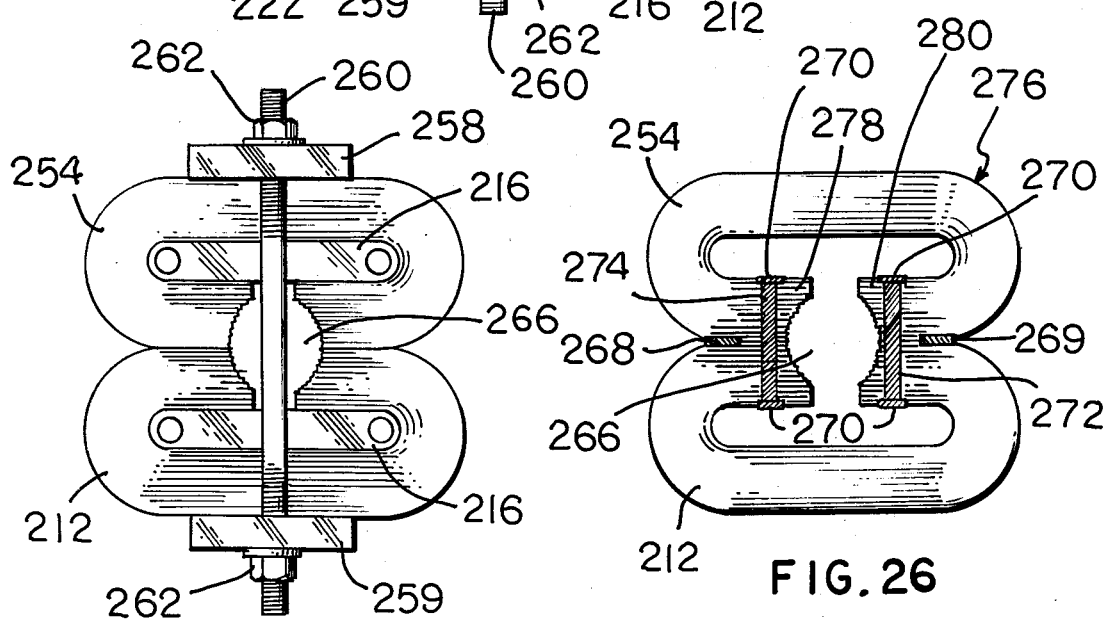
FIG. 25
FIG. 26
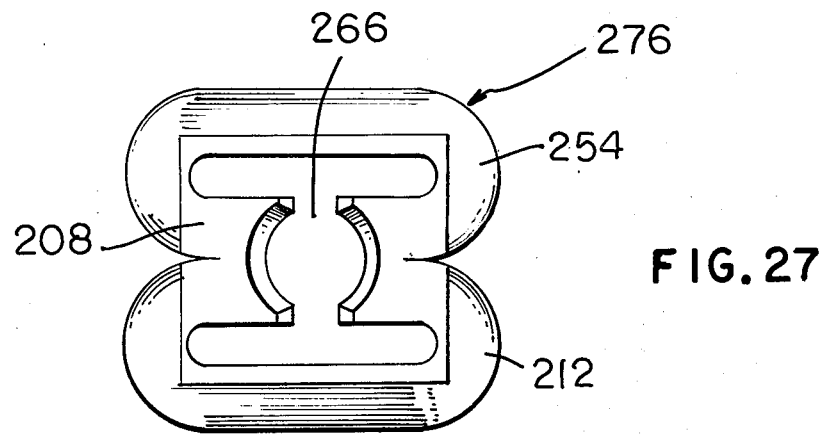
FIG. 27

METHOD FOR FORMING A MAGNETIC CORE FOR A LINEAR COMPRESSOR

CROSS-REFERENCE TO RELATED APPLICATIONS

This is a continuation-in-part of application Ser. No. 893,873 filed Apr. 6, 1978, which is a continuation of application Ser. No. 738,708 filed Nov. 4, 1976, which is a continuation of application Ser. No. 507,538 filed Sept. 19, 1974, now abandoned.

BACKGROUND OF THE INVENTION

This invention relates to reciprocating electric motors of the type in which a magnetically permeable armature is disposed to axially reciprocate within the air-gap of a fixed electromagnetic circuit, and in particular to a method for forming the magnetic core for the electromagnetic circuit.

In the art of moving-iron linear-motor compressors, much effort has been expended without having achieved significant commercial success (see P. W. Curwen, "Recent Developments of Oil-Free Linear-Motor Resonant-Piston Compressors," ASME publication 69-FE-36, June 1969). The linear-motor compressor disclosed herein has been subjected to extensive laboratory testing and the design parameters have been verified through the use of iterative computer programming techniques, and therefore, the requirements of a commercially viable product are believed to have at last been achieved.

One known method for forming the magnetic core for a linear-motor compressor is to stack a plurality of magnetic plates along a direction coincident with the axis of reciprocation of the armature. The plates are normally pre-stamped to thereby form the opening for the air-gap and the bolt holes.

SUMMARY OF THE INVENTION

In one method disclosed herein, the magnetic core is formed by spirally winding a pair of convoluted loops of magnetic strip material on an oblong mandrel or, alternatively, a pair of spaced pins, so as to form a pair of generally oval coils of magnetic strip material. The coils are then placed in a common plane perpendicular to the axis of reciprocation such that they are in flatwise abutment and the air-gap, which is preferably conical, is machined out in the area of abutment.

One problem with this method is that high tension is required to achieve formation of the inner turns of the core, which may be formed on a pair of spaced apart pins. As succeeding layers are applied, the radius of curvature increases and permits creep or tightening of the core. Upon removal from the winding pins, the residual stress distribution on the inner layers is sufficiently compressive to cause the inner turns to buckle, in many cases.

According to another method disclosed herein, buckling is avoided thereby requiring less stress relieving and ultimately providing a structure which is more dimensionally stable than those formed by the method just described. This method comprises the steps of spirally winding first and second inner convoluted cylindrical coils of magnetic strip material, deforming each of the cylindrical coils into a generally oval configuration, positioning the first and second coils in a common plane perpendicular to the axis of reciprocation of the armature such that adjacent sides of the coils are in flatwise abutment on a plane perpendicular to the common plane, and fastening the first and second coils together. The air-gap is then formed in the area of abutment of the coils in the same manner as with the first-discussed method.

A disadvantage to the two methods last discussed above is the loss of material which is incurred during machining of the conical air-gap and which is substantial in relationship to the amount of material employed in forming the core. The method according to the present invention overcomes this disadvantage by bending two stacks of pre-cut strips to form a core wherein the air-gap is nearly completely formed. Specifically, this method comprises these steps of: stacking a plurality of strips of magnetic material wherein the respective strips are of diverse lengths and are stacked in order of increasing or decreasing lengths, bending the two such stacks of strips around the respective shortest length strips into generally C-shaped configurations wherein each of the C-shaped stacks have an air-gap space defined by the edges of the respective strips which is generally semi-circular in cross section, positioning the first and second C-shaped stacks in flatwise abutment in a common plane such that the respective air-gap spaces are in mutually facing relationship and together form said air-gap, and fastening said C-shaped stacks together in this position. The air-gap, which at this time is generally cylindrical in shape, is then machined to form the desired conical air-gap.

It is an object of the present invention to provide a moving-iron linear-motor compressor that is easy and economical to assemble.

It is another object of the present invention to provide a magnetic core for a moving-iron, linear-motor compressor which may be more easily assembled and which has less waste material than a core of conventionally stacked laminations. It is a related object to provide an economical method for manufacturing said magnetic core.

It is an object of the present invention, ancillary to that mentioned immediately above, to provide a magnetic care for a moving-iron linear-motor compressor which is incompressible in the direction of tightening of the compressor tie bolts in order to insure that the tie bolts continue to exert the retention stresses to which they are initially set during assembly to thereby maintain proper alignment of the core, armature and frame of the compressor.

It is yet another object of the present invention to provide a moving-iron, linear-motor compressor which is small in size and which may be easily packaged to suit a wide variety of applications.

The present invention further provides a moving-iron linear-motor compressor having a magnetic core which includes a pair of abutting convoluted loops of magnetic strip material spirally would on a plane perpendicular to the compressor axis of reciprocation with the magnetic core air-gap formed in the area of abutment of the two loops.

BRIEF DESCRIPTION OF THE DRAWINGS

The novel features which are considered characteristic of the invention are set forth in particular in the appended claims. The invention itself, however, together with additional objects, features and advantages thereof, will be best understood from the following description when read in connection with the accompanying drawings in which:

FIG. 4 is an axial sectional view of the compressor shown in FIG. 3 in a stage of partial assembly;

FIG. 5 is a fragmentary axial sectional view of the compressor shown in FIG. 3 in a second stage of partial assembly;

FIG. 14 is an elevational view showing winding of the cylindrical coil;

FIG. 15 is an elevational view of one of the cylindrical coils;

FIG. 16 is a perspective view showing the cylindrical coil being tensioned to deform it to its desired oval shape;

FIG. 17 is an elevational view showing a pair of the cylindrical coils as shown in FIG. 15 being simultaneously compressed to deform them into the desired oval shapes;

FIG. 24 shows two assemblies similar to FIG. 23, with the forming tool handles removed, clamped together;

FIG. 25 is a view similar to FIG. 24 wherein the end blocks have been removed;

FIG. 26 shows the nearly completed stator wherein the forming tool has been removed and the two stacks of laminations are joined by welding and the mandrels have been removed; and FIG. 27 is a view of the completed core wherein the conical air-gap has been machined therein.

DETAILED DESCRIPTION

Figure 3:
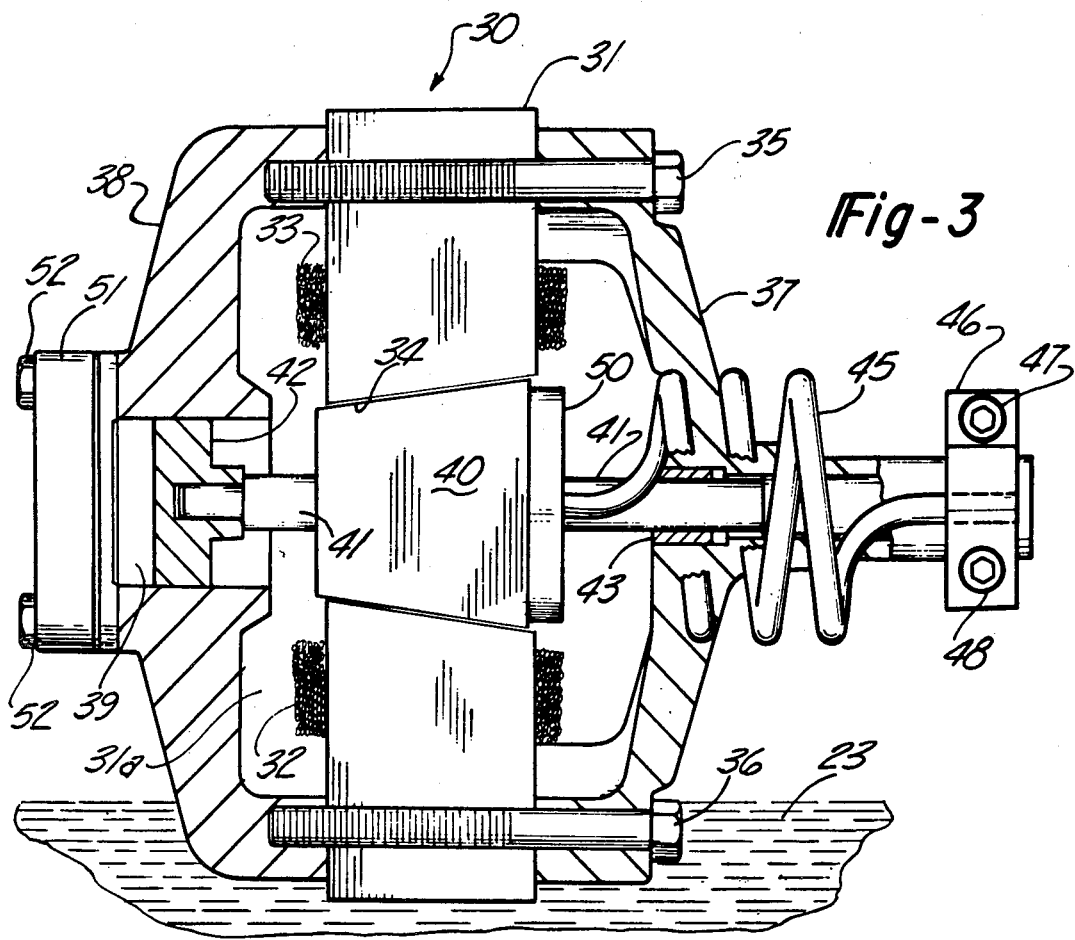
FIG. 3 is an elevational view of the compressor shown in FIG. 1 taken partly in axial section along the line 3—3 of FIG. 1.

In the various figures, identical reference numerals indicate identical parts. Referring to FIGS. 1-7, there is shown an exemplary embodiment of a linear-motor compressor 20 constructed pursuant to the disclosure of the aforementioned Bidol U.S. Pat. No. 3,947,155 which is disclosed herein as background. Compressor 20 is suspended within a protective enclosure 21 by the suspension springs 22 which ideally provide a zero retarding force to the axial oscillatory movement of compressor 20 and an infinite retarding force to lateral or radial oscillatory movement thereof. Enclosure 21 is hermetically sealed and may be formed of sheet steel or aluminum or molded plastic, and may assume a shape most convenient for the particular application. Lubricating oil is preferably provided in a sump 23 at the bottom of the enclosure at a depth sufficient to contact the lower portion of compressor 20. The oil will be splashed onto the moving parts by the axial reciprocating action of the motor. Alternatively, the oil may be channeled to lubricated surfaces by other means known in the art. The detailed description of compressor 20 may be best understood with reference to FIGS. 2-3. Magnetic circuit 30, which includes magnetic core 31 and windings 32 and 33, has a pair of spaced-apart poles 32a and 32b defining an airgap 34 with the opposed surfaces or pole faces of poles 32a and 32b defining a portion of a frustoconical surface of revolution. Attached to opposite sides of the magnetic circuit by means of bolts 35 and 36 is an outboard bearing and spring retainer plate 37 and a cylinder block 38 having a pump chamber or cylinder 39 formed therein. As shown in FIG. 3, the taper of air-gap 34 converges in the direction of chamber 39 with the center axis of gap 34 being coaxial with chamber 39.

Movable in air-gap 34 is a frustoconical armature 40 carried by an armature rod 41. Armature 40 may be made of either solid magnetically permeable material or stacked laminations as shown. It has been found that the use of stacked laminations increases the efficiency of the compressor by 15 percent when compared to an identical compressor with a solid magnetic core. Armature rod 41 may be made of nonmagnetic material, such as stainless steel, or, preferably, magnetically permeable material.

Mounted on one end of rod 41 and slidable in chamber 39 is a piston 42. For maximum compression efficiency, the sliding clearance between piston 42 and the side wall of chamber 39 must be small: a nominal clearance of 0.0003 inches is preferred.

Mounted in plate 37 is a sleeve bearing 43 disposed about rod 41 at the end thereof remote from piston 42. Because of the close sliding clearance between piston 42 and the wall of chamber 39, the piston will cooperate with bearing 43 to maintain rod 41 and armature 40 centered in air-gap 34 during axial displacement of the armature, rod and piston.

Slidably mounted on plate 37 and clamping one end of a pair of return springs 44 and 45 is an adjustable clamp bracket 46. Bracket 46 may be tightly clamped to plate 37 by means of screw 47 which is threadably received in a split or slotted offset portion of the clamp. The respective straight end-tang terminations 44a and 45a at the outboard end of springs 44 and 45 are clamped into associated holes 46a and 46b of bracket 46 by means of screws 48 and 49 which traverse associated bracket splits leading to each of the clamp holes. One end of each of return springs 44 and 45 is thus fixedly clamped in relation to magnetic circuit 30 and air-gap 34. The other straight end-tangs 44b and 45b of each return spring 44 and 45 is operatively clamped to armature 40 by means of a spring clamp plate 50 which is mounted on rod 41 against the large diameter face of conical armature 40.

End-tangs 44b and 45b are inserted into associated holes 50a and 50b respectively and clamped therein by means of screws 50c and 50d threadably received into respective split portions of clamp 50. It should be noted that springs 44 and 45 are coiled in the same direction but that each spring enters bracket 46 and clamp 50 from a direction 180° from the direction of entry of the other. In this configuration the bending forces imported upon armature 40 by the springs during axial reciprocation of the armature tend to cancel each other, thereby assisting bearing 43 and the bearing action of piston 42 to center armature 40 in air-gap 34 during reciprocating axial movement. It should be further noted that end-tangs 44a, 44b and 45a, 45b extend in a direction parallel to the central axis of the springs from the periphery of the respective springs. This feature allows bracket 46 and clamp 50 to assume a reduced diameter, thereby reducing dimensions of enclosure 21. While several methods of terminating and affixing springs 44 and 45 will be evident to those skilled in the art, it has been found that the use of straight end-tang terminations 44a, 44b and 45a, 45b on the return springs and the associated split clamp mounting facilitates adjustment and assembly.

Figure 1:
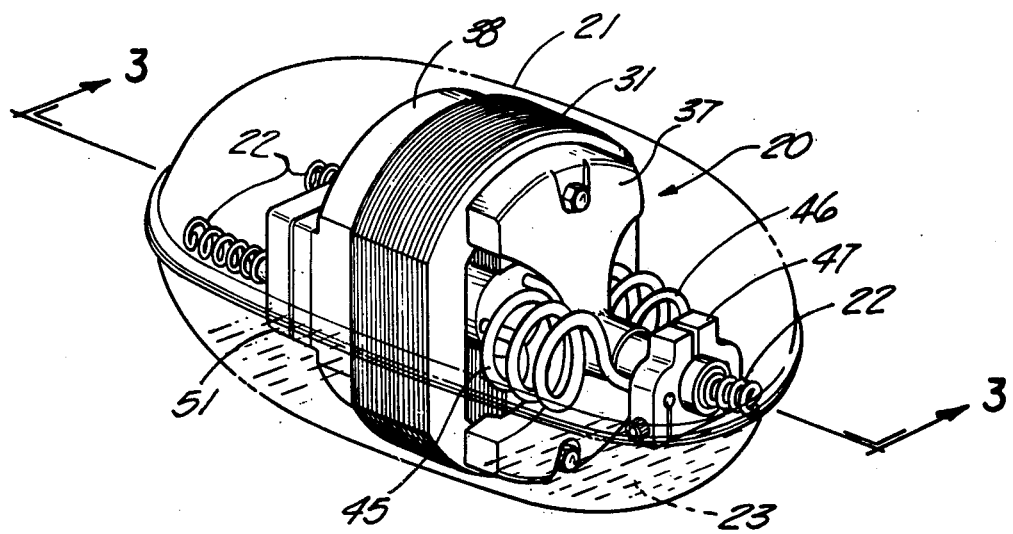
FIG. 1 is a perspective view of one embodiment of the linear-motor compressor hermetically encased within a protective housing.
Figure 2:
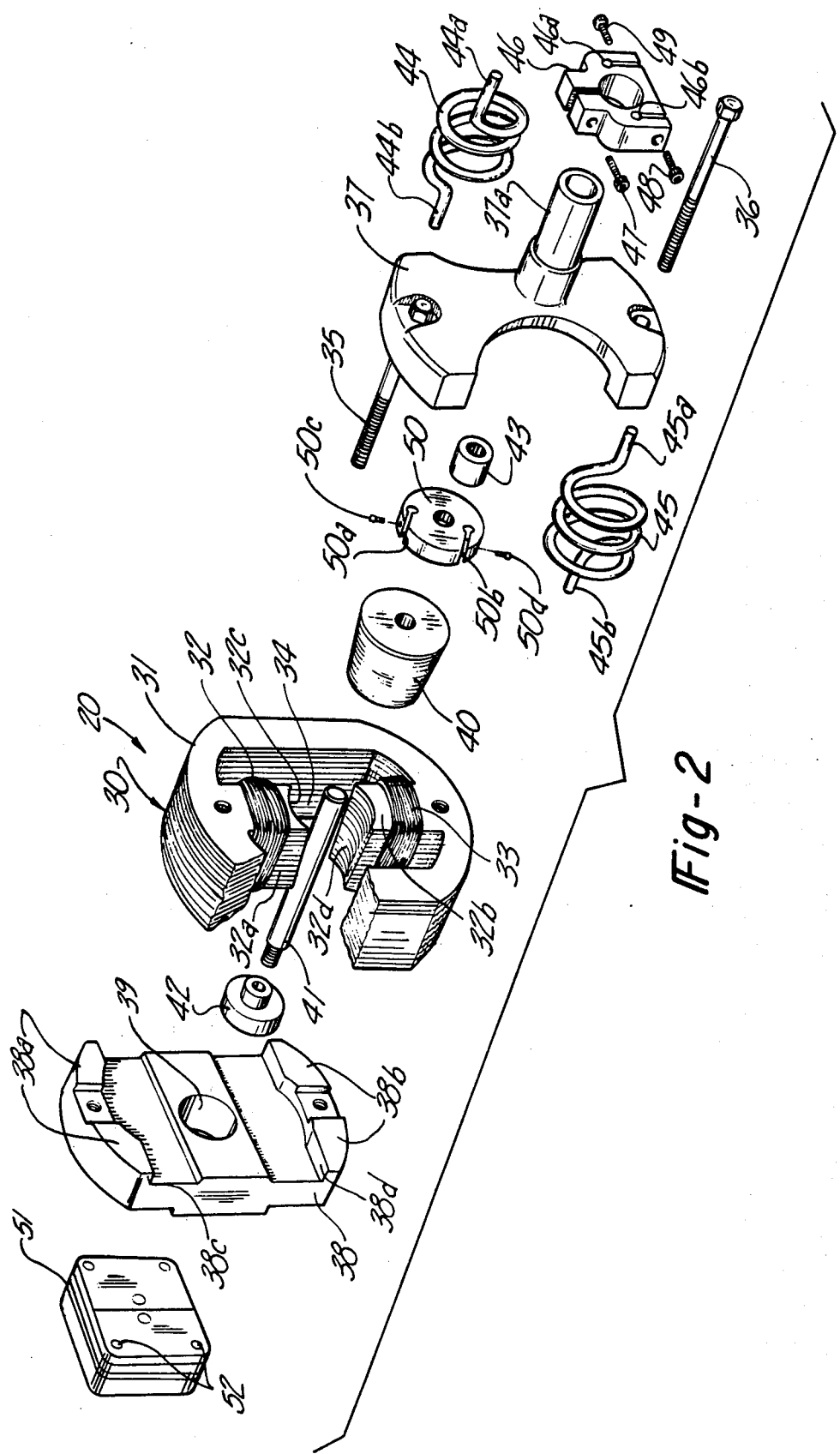
FIG. 2 is an exploded perspective view of the linear compressor motor and gas pump shown in FIG. 1.

Compressor 20 is suspended in sump 23 as detailed above with reference to FIG. 1. Because the lateral dimension of block 38, that is, the dimension perpendicular to a line between bolts 35 and 36 and perpendicular to the axis of reciprocation, is less than the corresponding lateral dimension of core 31, which relationship is best seen in FIGS. 1 and 2, and because of the access via side openings provided by the axial spacing of block 38 from core 30 due to mounting pads 38c and 38d (FIG. 2), oil splashed upwardly by the reciprocating action of compressor 20 will enter the chamber 31a (FIG. 3) between core 30 and block 38. Splashed oil which contacts the minor diameter face of armature 34 will be thrust into chamber 39 against the back of piston 42 by the reciprocating action of the armature. This oil will lubricate the sides of chamber 39 in the area of sliding contact with piston 42.

A valve plate and cylinder head assembly 51 is mounted on cylinder block 38 by means of bolts 52. The suction and discharge valves, the valve plate assembly, and the cylinder head may each be any one of the several standard designs known to the art and do not form a part of this invention. In a 450 BTU/Hr working embodiment of compressor 20 to be discussed in detail hereinafter, valve plate assembly 51 is an adaptation of the valve system from a commercially available Model AE Compressor manufactured by Tecumseh Products Company of Tecumseh, Michigan. Valve assembly 51 will not be discussed further except by reference during the discussion of the assembly and operation of the compressor.

The economical method of assembling compressor 20 may be best understood by reference to FIG. 4 in which compressor 20 is shown being assembled on an assembly surface 80. Cylinder block 38 is first placed head-end down on the assembly surface. Then magnetic circuit 30 is loosely placed on the accurately machined seating surfaces 38a and 38b of block 38 with the respective bolt holes of the core and block roughly aligned. The armature rod assembly, consisting of clamp 50, armature 40 and piston 42 all mounted on armature rod 41, is then seated in the magnetic circuit by being piloted piston-end first into chamber 39 until the piston extends sufficiently into chamber 39 such that the conical armature is seated against the pole faces 32c and 32d which define conical air-gap 34. Note in FIG. 4 that in this fully inserted condition piston 42 extends beyond the head-end face 38c of cylinder block 38 by an amount of distance indicated "b" when armature 40 abuts the pole faces. The purpose of this extension will be explained in the discussion of the operation of the compressor motor hereinafter. As the armature is being thus seated, the geometry of the armature and air-gap and the tight tolerance between the piston and chamber wall causes the armature rod assembly to act as a set-up jig which cams core 31 sideways so as to shift it laterally on faces 38a and 38b to thereby automatically center the magnetic circuit and cylinder block with one another and with the armature, rod and piston. The outboard bearing plate 37 and bearing 43 is next mounted on the magnetic circuit, and then bolts 35 and 36 are inserted through plate 37 and core 31 and threaded into block 38, thereby automatically aligning bearing 43 with the common axis of the air-gap and compression chamber and bringing the parts into accurate angular registry. Bolts 35 and 36 may be then tightened down to secure the sub-assembly.

In the next stage of assembly shown in FIG. 5, end-tangs 44a, 44b and 45a, 45b of return springs 44 and 45 are inserted and tightly clamped in adjustable bracket 46 and clamp 50. Bracket 46 at this stage is loosely received on a mounting post 37a of plate 37 so that it can move thereon as piston 42 is raised to rest upon a jig block 81 which is inserted below the piston in the pocket of the assembly surface 80. The piston and armature will then be in the desired rest position, and clamp 46 is then tightly clamped to post 37a after the valve plate and cylinder head assemblies 51 are mounted to the cylinder block, the motor will be ready for operation.

To operate the linear compressor motor, windings 32 and 33 must be connected to a source of alternating current. In the embodiment of the invention illustrated herein, the source of alternating current is half-wave rectified utility power at a frequency of 60 Hz. The motor thus operates at 3600 reciprocations per minute. It is well known in the art that maximum compressor efficiency will be achieved when the resonant frequency of the compressor during normal operation approaches the line frequency of the exciting voltage. Thus, the natural oscillating frequency of the piston, armature, rod and return springs taken together with the normal suction and discharge pressures in the compression chamber should approach 60 Hz. The natural frequency of the return springs together with the rod, piston and armature must, therefore, be less than the frequency of exciting current. In the disclosed embodiment, the natural frequency of the return springs and the rod, piston and armature is preferably substantially equal to 38 Hz.

Figure 6:
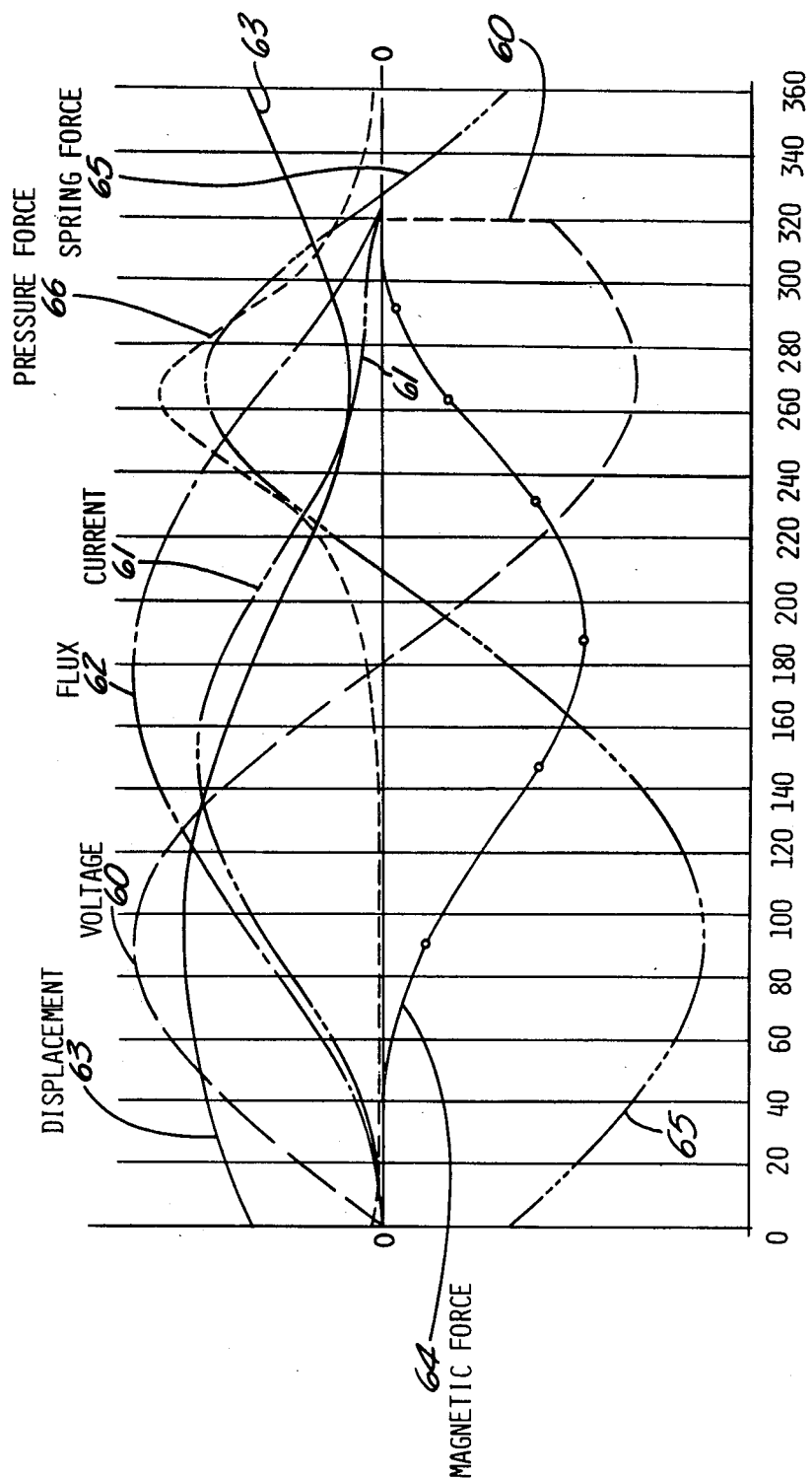
FIG. 6 is a graph used to explain the operation of the compressor shown in FIGS. 1-5.

Operation of compressor 20 may be best understood with reference to FIG. 6 which is a timing diagram depicting the relationships of selected parameters of compressor 20 during one cycle of line voltage. The line voltage 60 described a substantially sinusoidal pattern over the duration of a 360° cycle time. Because compressor 20 presents an inductive load to line voltage 60, it is to be expected that the current 61 will lag voltage 60 and describe a rectified half wave which is periodic but not sinusoidal. The flux 62 through magnetic circuit 30 follows, but slightly lags, current 61. The ordinates of voltage 60, current 61 and flux 62 are measured in units of volts, amps and kilomaxwells respectively and are not to scale. However, voltage 60, current 61 and flux 62 have a common zero ordinate reference for clarity of understanding. The armature displacement 63 is measured in units of inches with the zero displacement reference being the abutment position of armature 40 against pole faces 32c and 32d which reference position is depicted in FIG. 4. The magnetic force 64 is measured in units of pounds with reference to positive displacement of armature 40. Thus, magnetic force 64 which tends to move armature 40 in a negative direction, that is, a direction toward the zero displacement reference, is shown executing a negative excursion from the zero magnetic reference point. Similarly, spring force 65, which is the force exerted upon armature 40 by springs 44 and 45, and pressure force 66, which is the force exerted on the compression face of piston 42, are measured in units of pounds with reference to a positive axial displacement armature 40; that is, a spring or pressure force which tends to move armature 40 in the direction of positive axial displacement is considered to be a positive force. Magnetic force 64, spring force 65 and pressure force 66 have a common zero ordinate reference for clarity of understanding. The abscissa of FIG. 6 is measured in units of electrical time in degrees of a single cycle of line voltage 60. It should be noted with respect to FIG. 6 that, while the signals shown therein are not to scale, the geometry of each signal is duplicated from test results based upon the 450 BTU/Hr working embodiment to be set forth in detail hereinafter.

In the operation of compressor 20 voltage 60 begins a positive excursion at electrical time zero degrees and induces current 61 in the windings of magnetic circuit 30. Current 61 induces, in turn, flux 62 in core 31 and armature 40. Thus, starting at zero degrees electrical time, magnetic force 64 gradually increases (in the negative direction) and urges armature 40, and therefore piston 42, in the negative displacement direction. It will be noted from FIG. 6 that, at time zero degrees, armature 40 is moving in the positive displacement direction which means that, at the beginning of an electrical cycle, the armature is executing its return stroke, as opposed to its compression stroke, as a result of the momentum imparted to the moving assembly comprising armature 40, rod 41, piston 42 and clamp 50 by return springs 44 and 45 during the preceding electrical cycle. Spring force 65 is negative at time zero degrees indicating that springs 44 and 45 are in compression and exert a force on armature 40 in the negative displacement direction. Thus, shortly after time zero degrees, magnetic force 64 cooperates with spring force 65 to work against the momentum of the assembly to arrest positive displacement thereof and begin movement in the negative direction.

At an electrical time of 90 degrees, displacement 63 has reached its maximum value and the moving assembly has reached its "top dead point" of operation. The assembly will begin to move in the negative direction. As is to be expected, at time 90 degrees spring force 65 has reached its maximum negative or compression value and will begin to move in the positive direction. Magnetic force 64 will continue to increase in a negative direction as current 61 and resulting flux 62 increase. Armature 40 and piston 42 now move in the negative displacement or working direction toward the head-end of pump chamber 39, compressing the gas in chamber 39 to a desired discharge pressure at which the discharge valve will open.

When moving in the negative displacement direction, armature 40 will eventually pass its neutral position so that springs 44 and 45 go into tension and begin to retard further negative displacement of the moving assembly. In FIG. 6 this neutral or zero spring force position is achieved at an electrical time of approximately 208 degrees. It should be noted that at time 208 degrees flux 62 has already passed its maximum point and has begun to decline toward zero.

When magnetic force 64 and the rate of change of momentum of the moving mass 40, 41, 42 and 50 is equal to the sum of spring force 65 exerted on armature 40 by return springs 44 and 45 in tension and pressure force 66 exerted on the face of piston 42 by the compressed gas in chamber 39, positive displacement is arrested and the armature and piston reach their "bottom dead point" of operation. In FIG. 6 this occurs at an electrical time of approximately 265 degres. It should be noted that at this "bottom dead point" time flux 62 in magnetic circuit 30 is less than half of its maximum value.

Magnetic force 64 will continue to decline after bottom dead point time 265 degrees so that spring force 65 and pressure force 66 govern movement of the armature and piston and return the moving assembly in the positive displacement or return direction. Winding current 61 reaches a zero value at time 320 degrees. Because the current is rectified, voltage 60 returns to zero at this time. The moving assembly comprising armature 40, rod 41, piston 42 and clamp 50 continue motion in the positive displacement or return direction under the influence of pressure force 66 and spring force 65. Positive displacement 63 will continue to increase until the moving assembly reaches its top dead point of operation under the influence of the spring and magnetic forces as outlined above.

In prior linear-motor compressors of the type which include a cylindrical armature and air-gap, the armature is attracted into the air-gap and made to do work until it reaches a point at which its top and bottom end faces are flush with the faces defining the axially opposite ends of the air gap. At this point, the armature completely fills the air-gap and, since the air space between the armature and pole faces is constant, the reluctance of the total magnetic circuit is at a minimum. The armature can thus be made to do no further work in that cycle. It has apparently been assumed by others in the art that this constraint will also apply to a linear motor having a conical armature and air-gap; this, however, is not the case.

Indeed, maximum compressor efficiency is obtained when the conical armature "fills the air-gap" at the point of maximum flux and, since this maximum flux point will not necessarily occur at the "bottom dead point" of operation, it is advantageous to have the armature continue through the air-gap beyond this flush point. Since the air space between the conical armature and opposing pole faces is no longer constant and is, in fact, a function of axial displacement, the reluctance of the total magnetic circuit will continue to decrease even though part of the armature is moving out of the air-gap.

Returning to FIG. 4, it can be seen that armature 40 extends out of the air-gap a distance "a" when piston 42 extends a distance "b" beyond the end face of cylinder block 38. The flush condition will exist when the minimum diameters of the armature and air-gap are coplanar—i.e., when a −0. It is undesirable to allow armature 40 to strike the pole faces; for this reason, distance "a" is made much larger than distance "b". The piston will thus strike the valve plate before the armature can reach the pole faces, which prevents the armature from striking the pole faces.

Referring to FIG. 6, it will be seen that the "bottom dead point" of operation is achieved at an electrical time of about 265 degrees. At this time flux 62 in magnetic circuit 30 is less than half of its maximum value. Armature 40 is to be positioned on rod 41 so that the armature is flush with pole pieces 32a and 32b at an electrical time of approximately 180°, at which time flux 62 achieves its maximum value. This may be accomplished by modifying the diameter of air-gap 34 vis-a-vis the diameter of armature 40, while maintaining identical included angles of taper, so that when piston 42 is in the set-up position shown in FIG. 4, armature 40 extends through the air-gap a distance calculated to achieve the desired flush position at the desired time based upon the test results shown in FIG. 6. Referring again to FIG. 4, in the 450 BTU/Hr working embodiment of the compressor, armature 40 is positioned to extend approximately 0.350 inches beyond pole pieces when piston 42 extends 0.030 inches beyond the head-end of cylinder block 38.

The minimum air space between the pole faces and the armature will exist when the piston abuts the valve plate assembly. In the disclosed embodiment this minimum space, that is, the minimum distance from a pole face to the armature as measured in a direction perpendicular to the pole face, is substantially 0.0035 inches. It would, of course, be undesirable to allow the piston to continually strike the valve plate during normal operation. However, as is well known in the art, compression efficiency is optimized when the distance between the piston face and the valve plate approaches zero at the "bottom dead point" of operation. Magnetic force, spring force and compression force must be thus optimized to achieve maximum compression efficiency without allowing the piston to strike the valve plate.

While it has been stated for purposes of explaining the operation of the compressor of FIGS. 1–5 that the armature moves "into" and "out of" the air-gap, it will be appreciated from the discussion immediately above that the armature need not move "entirely out of the air-gap" nor for that matter need "a major portion thereof" be located outside of the air-gap at the "top dead point" of operation, contrary to the disclosures in the U.S. Barthalon Pat. Nos. 3,542,495 and 3,461,806 respectively. Indeed, in the embodiment disclosed herein, which operates at 450 BTU/Hr at standard rating point conditions, the total compression stroke is only 0.8 inches, and the armature exposure at the "top dead point" of operation is less than 50 percent.

When the magnetic circuit reluctance characteristics detailed above have been defined—i.e., a substantially linear reluctance curve over the entire stroke length and an armature flush condition at the time of maximum flux—then the included angle of taper of armature 40 and air-gap 34 may be specified. As stated above, it has been found that, under the above recited conditions, a piston extension dimension "b" of 0.030 inches yields good results. To achieve this dimension, the included angle of taper of the armature and air-gap should be at least 10°, and a range of taper included angles between 10° and 14° is preferred.

The aforementioned Barthalon patents teach that the efficiency of a linear motor will be optimized if the reluctance of the magnetic circuit varies linearly with armature movement. As the aforementioned patent of Michael K. Bidol teaches, the stability of a pump which may occasionally operate below atmospheric pressure, such as a refrigeration compressor, will be enhanced if the linear reluctance curve also has a low slope. The various design parameters have been optimized in the present compressor motor to achieve this desired result. While it is not necessary to have the angle of taper of the armature identical to that of the air-gap, it has been found that this condition gives the best overall results. It has also been found that the best results are achieved if the net cross section of the armature, that is, the cross sectional area of the armature taken on a plane through the center of the armature parallel to the axis of movement and excluding the armature rod, is equal to about 80 percent of the effective cross sectional area of the pole piece. The effective cross sectional area of the pole piece is that area taken on a plane parallel to the axis of movement of the armature and perpendicular to the flux through the pole piece. The shape of this cross section should be substantially square rather than rectangular to achieve the minimum winding length per unit of desired flux. The gross cross sectional area of the armature, that is, the cross sectional area of the armature taken as above but including the armature rod, should be greater than the effective cross sectional area of the pole piece. This arrangement yields good results, particularly when an armature rod of magnetically permeable material is used to increase the "magnetic cross section" of the armature.

Figure 7:
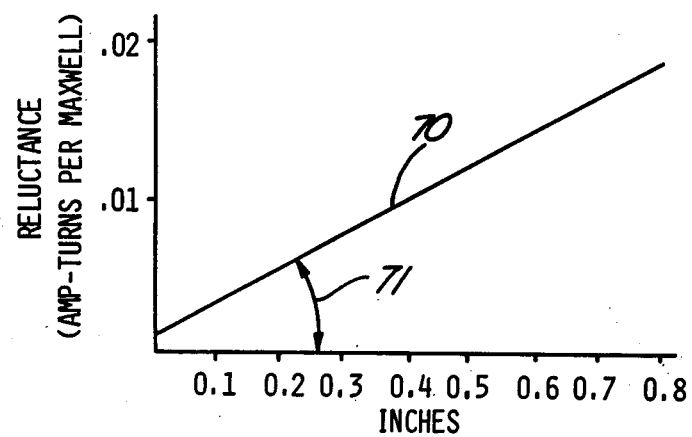
FIG. 7 is a graph of the reluctance curve of one embodiment of the compressor of FIG. 1.

The reluctance curve of the above-mentioned 450 BTU/Hr embodiment is shown in FIG. 7. In the curve 70 of FIG. 7 the abscissa is in inches of displacement as measured from the condition of FIG. 4 when the armature is seated in the magnetic core. The ordinate measurement of reluctance indicates that minimum reluctance at the position of FIG. 4 is approximately 0.001 ampere-turns per maxwell. It has been found that an excessive slope angle 71 is accompanied by frequent impact of piston 42 upon valve plate 51, while an insufficient slope results in loss of mechanical efficiency and a reduced range of conditions for successful operation. It will be noted that reluctance curve 70 is substantially linear over the entire stroke of 0.8 inches and has a slope of approximately 0.022 ampere-turns per maxwell-inch. The parameters of this 450 BTU/Hr working embodiment which contribute to this low-sloped, linear reluctance curve, and the consequent high compressor efficiency, are set forth in the discussion of the working embodiment detailed hereinafter.

Figure 8:
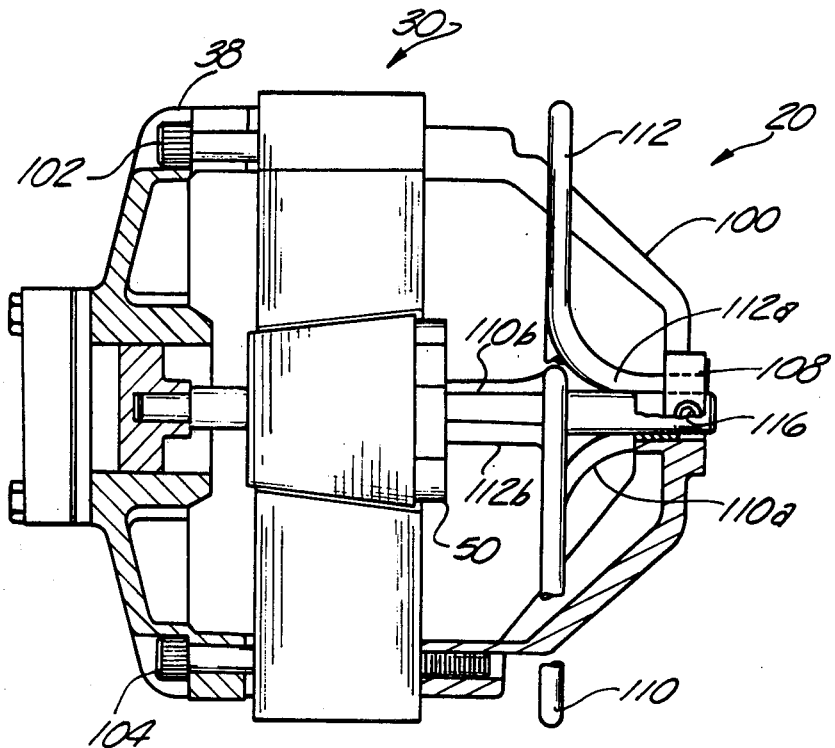
FIG. 8 is a fragmentary axial sectional view of an alternative embodiment of the compressor of FIG. 1 which includes a pair of zero-pitch internesting springs.
Figure 9:
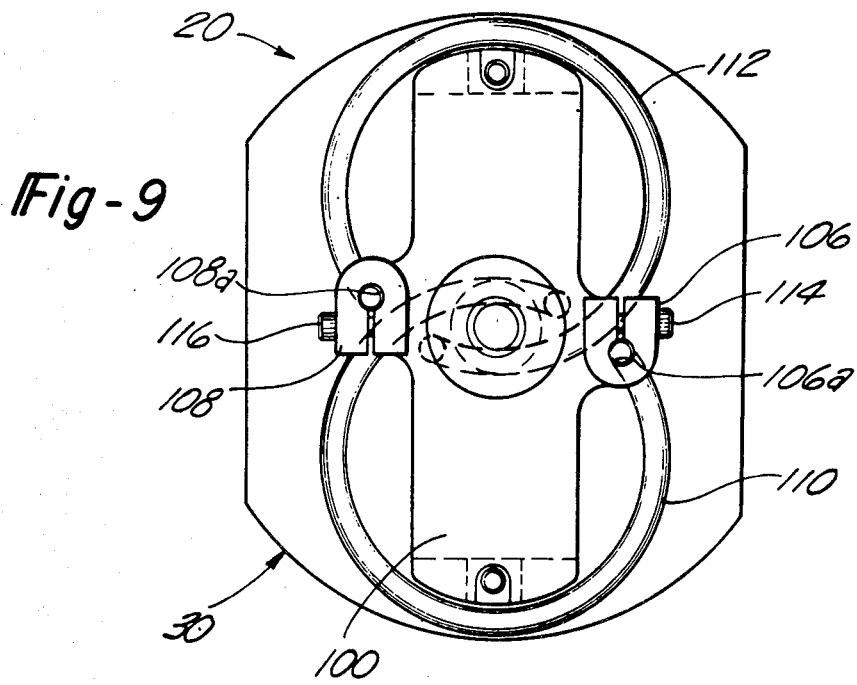
FIG. 9 is an end view of the compressor of FIG. 8 which shows the internested relationship of the springs in greater detail.

An alternative to the three-turn paired spring arrangement in the compressor of FIG. 1 is shown in FIGS. 8 and 9. An outboard bearing and spring retainer plate 100 is clamped to magnetic circuit 30 and cylinder block 38 by the tie bolts 102 and 104. Plate 100 has a pair of spring retainers 106 and 108 each of which fixedly clamps one end of the zero pitch linear springs 110 and 112. Respective straight end-tang terminations 110a and 112a at the outboard end of springs 110 and 112 are clamped into associated holes 106a and 108a of clamps 106 and 108 by means of screws 114 and 116 which traverse associated bracket splits leading to each of the clamp holes. End-tangs 110b and 112b are similarly clamped to armature 40 by means of spring clamp plate 50.

It will be appreciated by those skilled in the art that, depending upon the manufacturing technique used to fabricate the springs, a "zero pitch" spring will have a pitch between zero and the diameter of the spring material. Where straight end-tangs are required, the spring is usually first coiled on a circular mandrel or jig with the end-tangs extending tangentially from the coil. The end-tangs are then bent to positions perpendicular to the plane of the coil. The pitch of the spring thus formed will be substantially equal to zero within some tolerance range which depends upon the resilience of the material used to wind the spring.

There are approximately 0.92 turns of spring material in springs 110 and 112. End-tangs 110a and 110b of spring 110 are thus laterally spaced from each other allowing room for spring 112 to pass therethrough before terminating in clamp 50. Similarly, end-tangs 112a and 112b are spaced to allow passage of spring 110 therebetween, thereby internesting the springs. In this geometry the coils of springs 110 and 112 are aligned with a line connecting tie bolts 102 and 104 rather than being perpendicular therewith and are contained within the lateral perimeter of compressor 20 defined by magnetic circuit 30, thereby reducing the lateral and axial dimensions of the compressor. Furthermore, with the coils of springs 110 and 112 disposed in axial proximity to magnetic circuit 30, housing 21 which encompasses compressor 20 may assume an eliptical shape which is believed to reduce the level of acoustical noise emanating from an operating unit.

The zero pitch internesting springs shown in FIGS. 8 and 9 have the additional advantage of reducing the twisting forces imparted upon armature 40 almost to zero. This reduction in the torsion or twisting forces on the armature and springs results in long spring life and helps maintain armature 40 within air-gap 34 during axial reciprocation thereof.

Figure 10:
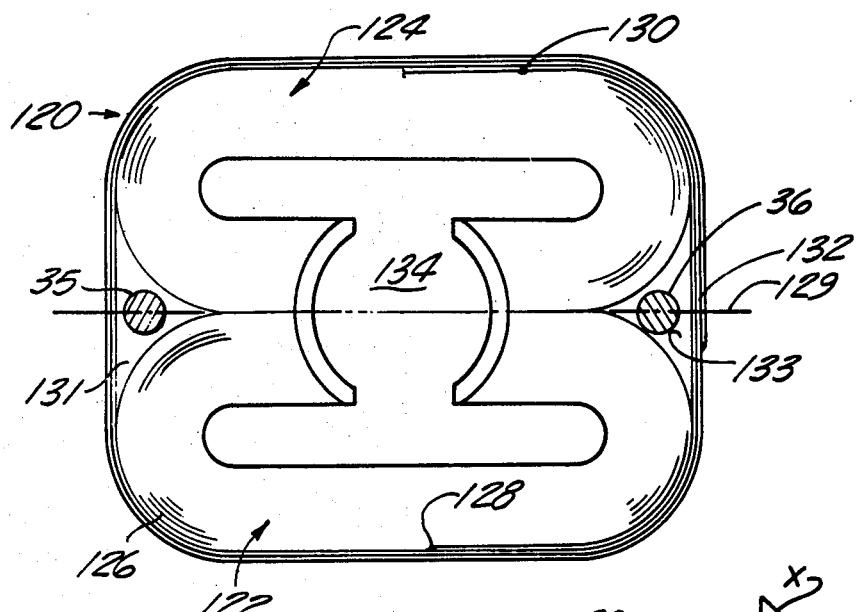
FIG. 10 is a plan view of a modified magnetic core which may be used in the compressor of FIG. 1.

As shown in FIG. 2, magnetic core 31 comprises stacked laminations attached in a manner well known in the art. Alternatively and preferably, the magnetic core may be comprised of first and second inner loops spirally wound of magnetic strip material with the loops placed in abutment and banded together by an outer loop of the same magnetic strip material. Such a core 120 is shown in FIG. 10 and is constructed by first separately winding a pair of identical inner loops 122 and 124 of magnetic strip material to form spiral wrap pattern 126. When loop 122 has reached the desired thickness, the strip material may be terminated and tacked as shown at 128. When loop 124 has reached the desired thickness, the strip material is to be tacked as at 130, but need not be terminated. Loops 122 and 124 are then placed in flat end abutment on plane 129 and the magnetic strip material extending from tack 130, or a separate strip material tacked onto either loop at a convenient attachment point, is wound around the exposed periphery of the dual loop subassembly to form an outer convoluted loop 132 which holds inner loops 122 and 124 tightly together as disclosed in U.S. Pat. No. 2,431,128. Conical air-gap 134 is then machined in the area of abutment of inner loops 122 and 124. Windings 32 and 33 will be wound about the opposing pole pieces and will have magnetic communication carried entirely by the inner loops. For this reason, outer loop 132 may be of any convenient material. The magnetic core shown in FIG. 10 is more easily assembled and has less waste material then stacked lamination core 33.

Figure 11:
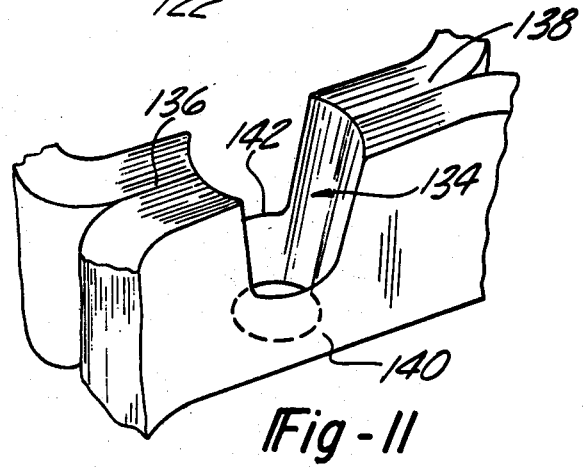
FIG. 11 is a perspective view of the air-gap in the core of FIG. 10 at an intermediate stage of fabrication.

FIG. 11 is a perspective view of conical air-gap 134 after the air-gap is first machined into the area of abutment of first and second loops 122 and 124. When the minor diameter of gap 134 is less than the width of the core (i.e., the dimension perpendicular to plane 129), then the pole pieces 136 and 138, rather than being isolated from each other, are connected by the magnetic bridges or connections 140 and 142 on either side of the machined gap. In order to prevent a short in the magnetic circuit and to facilitate the mounting of windings 32 and 33 upon pole pieces 136 and 138, connections 140 and 142 must be removed at a second machining stage in the fabrication of magnetic core 120.

Figure 12:
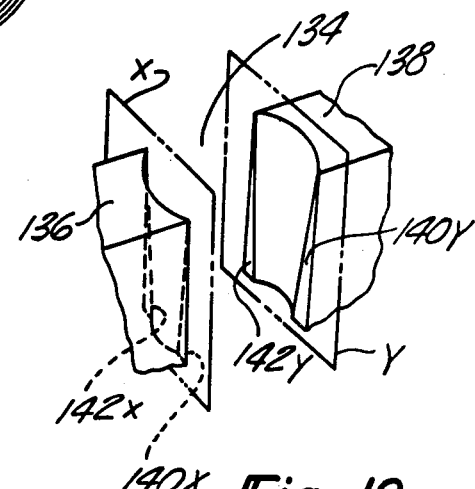
FIG. 12 is a perspective view of the completed air-gap in the core of FIG. 10.

FIG. 12 is a perspective view of air-gap 134 in magnetic core 120 after bridges 140 and 142 have been removed. Bridges 140 and 142 have been removed by machining across the faces of pole pieces 136 and 138 in a pair of plates X and Y respectively perpendicular to the central axis of poles 136 and 138 and parallel to but displaced on opposite sides of the axis of reciprocation. When the distance between planes X and Y is less than the maximum diameter of gap 134, this machining will produce in these planes the triangular coplanar exposed gap surfaces 140x, 142x, and 140y, 142y upon opposing faces of pole pieces 136 and 138 respectively. When the gap between planes X and Y is to be only sufficient to allow insertion of windings 32 and 33, a distance between the planes of 16.7 percent of the cross-sectional area of the poles is sufficient.

Figure 13:
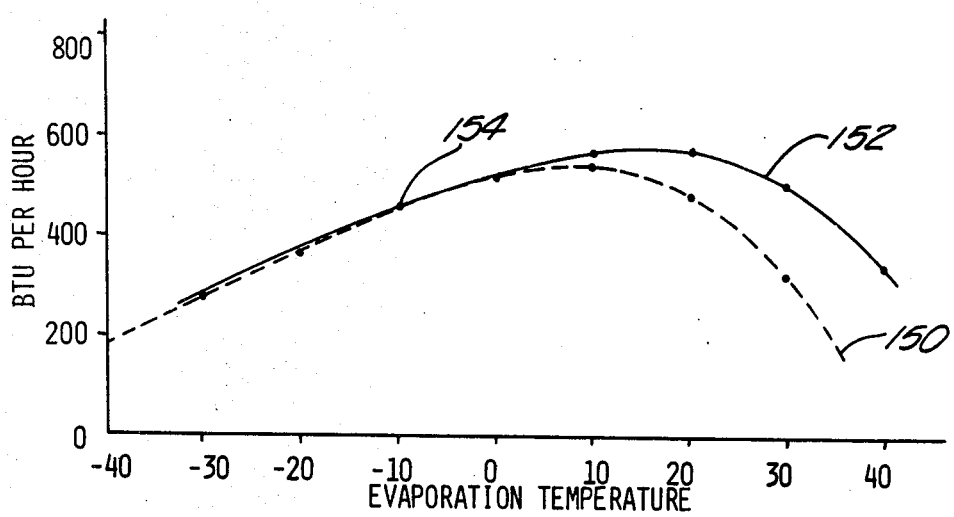
FIG. 13 is a graph used to explain the operation of the modified core shown in FIG. 10.

However, it has been discovered pursuant to the present invention that compressor operation is enhanced when the distance between planes X and Y is increased beyond this 16.7 percent figure. In a specific 450 BTU/Hr working embodiment of the present invention having 1.5 inch-square poles, the distance between planes X and Y was increased to 0.8 inches or approximately 35.5 percent of the cross-sectional area of the poles. This arrangement yielded the results shown in FIG. 13 when compared to a similar 450 BTU/Hr unit with a planar gap of 0.375 inches or 16.7 percent. In FIG. 13 BTU/Hr output is plotted versus evaporation temperature. Dashed curve 150 depicts the output of the 0.375 inch unit over a wide range of evaporation temperatures while curve 152 represents the output of the 0.8 inch unit over the same range. It can be seen that the two units perform equally at rating point conditions—point 154—and perform similarly at evaporation temperatures lower than rating point. However, at higher evaporation temperatures the performance of the 0.375 inch unit falls off much more rapidly than the performance of the 0.8 inch unit. It should be noted that the curves of FIG. 13 were plotted from actual test results and are to scale.

Strip wound core 120 may replace laminated core 31 in compressor 20 of FIG. 2. In this preferred compressor assembly, tie bolts 35 and 36 pass through a pair of substantially triangular apertures 131 and 133 which are formed in the area of abutment of inner loops 122 and 124 and are bounded by the inner loops and outer loop 132 as best seen in FIG. 10. Apertures 131 and 133 afford core 120 a greater degree of lateral "slop" in the assembly stage, thus facilitating the automatic alignment process discussed above with respect to FIG. 4. In addition, since the individual wraps or laminations of core 120 are layered in a direction perpendicular to the axis of reciprocation and to the axes of tie bolts 35 and 36, the retention stresses exerted by the tie bolts are taken edgewise by each wrap instead of parallel to the thickness dimension of each wrap. Hence, the core laminations or wraps are not subjected to bolt forces tending to squeeze them together. Due to this orientation of the bolts parallel to the lateral or width dimension of the wraps, the strip wound core is not compressible in the direction of tightening of the tie bolts. For this reason, it is easier to hold alignment tolerances when core 120 is used.

Several working embodiments of compressor 20 have been built and tested; one such embodiment is the 450 BTU/Hr (nominal) unit mentioned above and drawn to scale in FIGS. 1-5. By way of example and not by way of limitation, the parameters which contribute to the low-slope linear reluctance curve and the resulting high compressor efficiency at rating point conditions are as follows:

| | |
|---|---|
| mass of piston 42 | 0.17 lbm |
| mass of armature 40 | 0.8 lbm |
| mass of rod 41 | 0.13 lbm |
| mass of clamp 50 | 0.12 lbm |
| effective mass of springs 44 and 45 (⅓ actual mass | 0.08 lbm |
| rate of springs 44 and 45 | 200 lb/in |
| material of rod 41 | 1060 steel |
| net cross-sectional area of armature 40 | 1.76 sq. in. |
| Gross cross-sectional area of armature 40 (and 41) | 2.32 sq. in |
| effective cross-sectional area of pole pieces 32a and 32b | 2.25 sq. in. |
| resistance of windings 32 and 33 | 2.10 ohms |
| number of turns in windings 32 and 33 | 400 |
| refrigerant suction pressure | 4.4 psig |
| refrigerant discharge pressure | 180 psig |
| refrigerant temperature entering compressor housing | 90° F. |
| bore | 1.156 inches dia. |
| flux path area | 2.25 sq. in. |

In the working embodiment with the above exemplary parameters, the following results were measured at refrigeration industry standard rating point conditions after 10,000 hours of operation:

| | |
|---|---|
| capacity | 485 BTU/Hr |
| power input | 134 watts |
| efficiency | 3.62 BTU/watt-hour(Weston) |

In addition, the following results, which are difficult to accurately measure in a working linear compressor, were calculated from a computer analysis of the 450 BTU/Hr model, the analysis being similar to that set forth above with reference to FIG. 6:

| | |
|---|---|
| length of stroke | 0.54 in. |
| position of A/C power cycle at "top dead point" of operation | 91 degrees |
| position of A/C power cycle at flush position | 207 degrees |
| current at flush position | 4.9 amps |
| flux at flush position | 213 kilomaxwells |
| position of A/C power at maximum flux | 180 degrees |
| current at maximum flux | 7 amps |
| maximum flux | 231 kilomaxwells |
| spring force at "top dead point" of operations | −70 lbf |
| spring force at "bottom dead point" of operation | +38 lbf |
| position of A/C power at opening of discharge valve | 252 degrees |

As discussed above, reluctance curve 70 at FIG. 7 indicates that this embodiment achieved the objective of having a low-sloped, linear reluctance curve. Furthermore, the above data indicates that the objective of achieving maximum flux at the flush position has been achieved within 8 per cent.

Referring to FIGS. 14–19, an alternative method for forming the magnetic core will be described. Similarly to the magnetic core of FIG. 10, the core according to this embodiment of the invention comprises first and second loops of spirally wound magnetic strip material with the loops placed in flat-wise abutment. The loops may be welded together or, alternatively, banded together by an outer loop of the same magnetic strip material.

Rather than winding the two coils in oval form, however, the strip material is wound into cylindrical coils as by the apparatus illustrated in FIG. 14. The winding apparatus comprises a frame 144 on which a coil of magnetic strip material 146 is rotatably mounted and feeds a take-up spool 148 driven by motor 150. Thus, the magnetic strip material 152 is wound into a cylindrical coil 153 and welded at its two ends 154 and 156 to prevent unrolling thereof. Two such coils 153 are formed and they are then deformed into the oval configuration similar to those illustrated in FIG. 10.

One method for deforming the cylindrical coils 153 is to place them in a tensioning device comprising two pairs of arms 158 and 160 each of which is interconnected by respective pins 162 and 164. The coil 153 is slid within arms 158 and 160 and they are then pulled in opposite directions so as to apply pulling forces to coil 153 at diametrically opposite points of its inner surface 166. These forces flatten coil 153 to cause it to attain the configuration shown in FIG. 16.

An alternative method for deforming coils 153 to the desired oval configuration is to place two cylindrical coils 153 in a clamping apparatus 168. Apparatus 168 comprises upper and lower clamp plates 170 and 172 which are connected by means of threaded rods 174 and 176. As nuts 178 are tightened, plates 170 and 172 will be drawn together thereby compressively deforming coils 153. If desired, elongated mandrels 180 and 182 may be placed within coils 153 prior to deformation.

Figure 18:
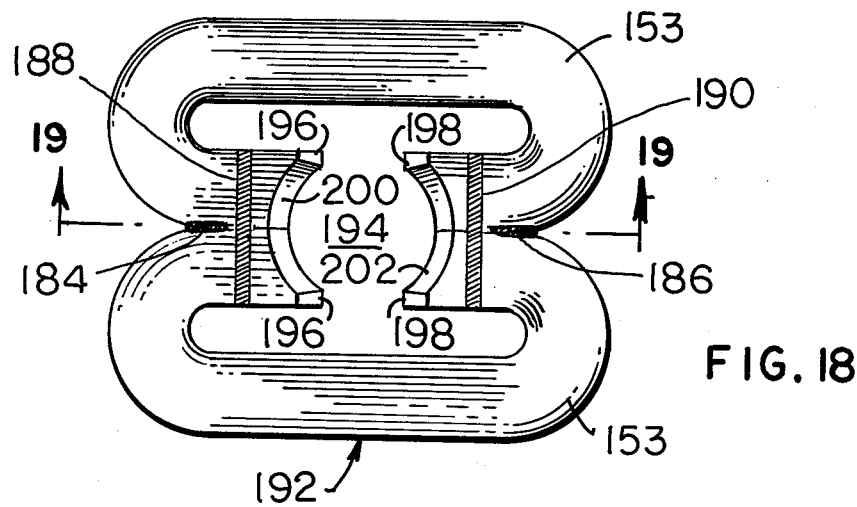
FIG. 18 is an elevational view of the air-gap in the core of FIG. 17.
Figure 19:
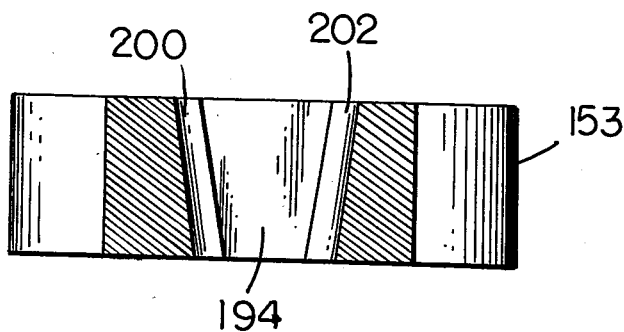
FIG. 19 is a sectional view of the magnetic core of FIG. 18 taken along line 19—19.

The completed core is illustrated in FIG. 18 wherein the coils 153 have been welded together at points 184, 186, 188 and 190. Welds 188 and 190 are strip welds which extend along one side of core 192. The conical air-gap 194 has been machined in through the common area of coils 153 in the same manner as described in connection with the previous embodiment. If desired, pole faces 196 and 198 may be machined generally parallel to surfaces 200 and 202, respectively, instead of parallel to the axis of reciprocation.

The magnetic core comprising coils 153 is preferably subjected to a stress-relieving heat treatment prior to the machining of air-gap 194. This stress-relieving may be accomplished either before or after coils 153 are removed from clamp 168.

In accordance with the present invention, the magnetic core is formed from a plurality of magnetic strips which are bent to the desired shape. This process for forming the magnetic core is illustrated in FIGS. 20-27.

Figure 20:
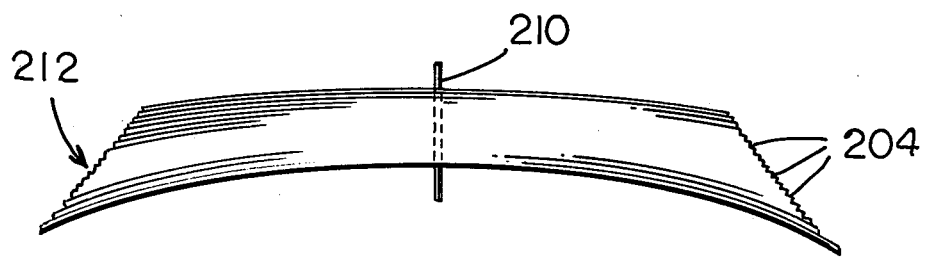
FIG. 20 is an elevational view of a set of precut laminations inserted within a form for formation into a magnetic core in accordance with the present invention.

Referring first to FIG. 20, a plurality of segments 204 of magnetic strip material are cut in selected lengths, preferably in a progressive blanking operation. In one working embodiment of the invention having 1.5 in. square poles 278 and 280 (FIG. 27), 56 segments of glass-coated strip material having a thickness of 14 mils are used. The length of each segment differed from the others, ranging from 6.88 in. to 11.00 in. The length of each segment 204 is selected to approximate as closely as possible the desired air-gap before the final machining step as will be discussed hereafter.

The segments 204 are then stacked in decreasing order in one direction to form two pyramidal stacks, one of which is shown in FIG. 20. A pin 210 may be threadedly engaged through a central hole in each segment 204 and is utilized to locate and hold segments 204 in the desired positions relative to each other.

Although the present application is not limited to a particular apparatus for bending the stacks 212 to the desired C-shape configuration, a suitable hand tool for accomplishing this will be described in some detail. Obviously, if the cores are mass produced, automatic forming machinery would be utilized.

Stack 212 is then inserted in a forming tool 214 which comprises a mandrel 216 positioned on the shorter side of stack 212, a pair of handles 218 and 220, which hook over pins 221 and 222 inserted through openings in mandrel 216 and extending beyond the opposite sides thereof. A backing plate 224 is positioned against the long side of stack 212, and stack 212 is clamped between plate 224 and mandrel 216 by means of a pair of oppositely positioned lamination clamps 226 each having pins 227 which engage openings in mandrel 16. Backing plate 224 is notched so as to receive a pair of screws 228 which engage the upper surface of backing plate 224 and clamp it tightly against stack 212 as screws 228 are tightened. Handles 218 and 220 include rollers 230 and 232, respectively, which are rotatably mounted on roller axle pins 234 and 236. Rollers 230 and 232 extend substantially the width of stack 212 and are supported between a pair of respective arm members forming handles 218 and 220.

Figure 21:
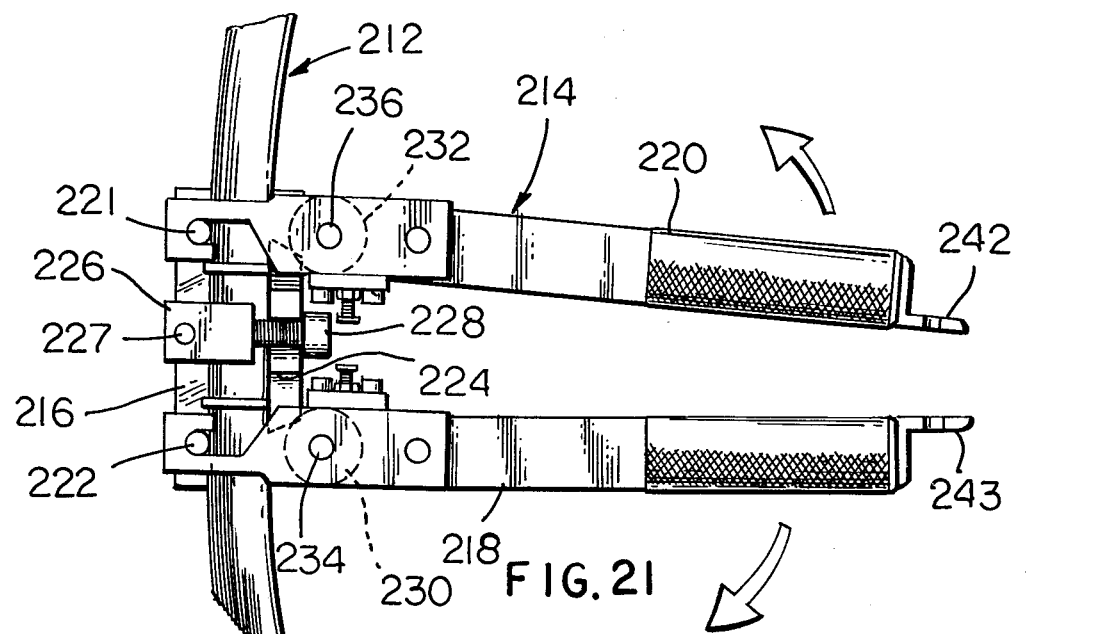
FIG. 21 is a fragmentary view of the stack and form of FIG. 20 with the rest of the forming tool in place and wherein the arrows show the directions of movement of the forming tool handle.
Figure 22:
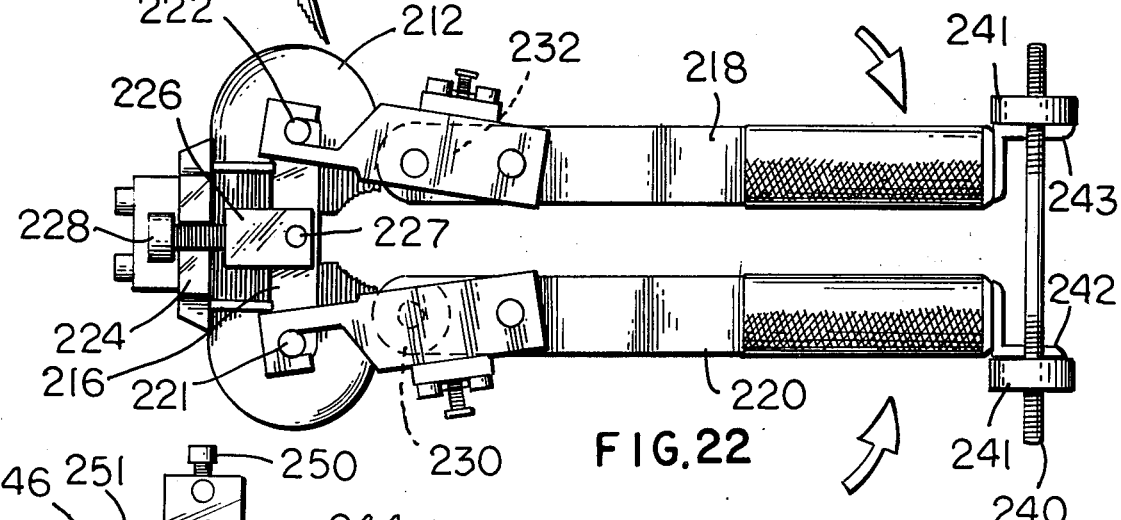
FIG. 22 is a view similar to FIG. 21 wherein the forming tool handles have been rotated 180° so as to bend the stack of strips into a C configuration.

Handles 218 and 220 are then rotated about pins 222 and 221, respectively, in the respective directions indicated by the arrows in FIGS. 21 and 22 until they reach the positions shown in FIG. 22. It should be noted that FIG. 22 shows the assembly of FIG. 21 in the reverse position. During forming, rollers 230 and 232 engage the longest segment 238 of stack 212 and bend stack 212 around mandrel 216 in the direction of decreasing length to a generally C-shaped configuration as shown in FIG. 22. At this point, handles 218 and 220 are locked together by means of threaded rod 240 and nuts 241 which retain handle clamping brackets 242 and 243.

Figure 23:
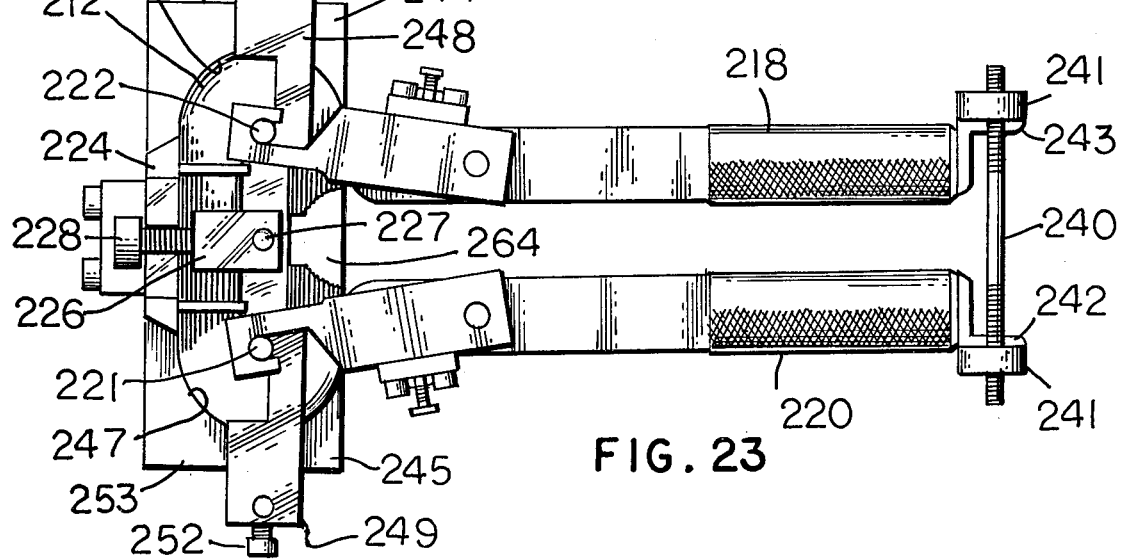
FIG. 23 is a view similar to FIG. 22 wherein the end blocks have been installed.

Referring to FIG. 23, end blocks 244 and 245 having semi-circular inner surfaces 246 and 247, respectively, are installed and clamped against stack 212 by means of clamps 248 and 249. Clamp 248 hooks over pin 222 and is drawn tightly against stack 212 by means of set screw 250 which is tightened against the end 252 of end block 244. In a similar fashion, clamp 249 hooks over pin 221 and clamps stack 212 between mandrel 216 and end block 245 as screw 252 is tightened against the end 253 of end block 245. At this point, forming tool 214 may be removed.

A second C-shaped stack 254 is formed in the same manner and these stacks 254 and 212 are clamped together by means of the clamping device 256 shown in FIG. 24. Clamp 256 comprises a pair of clamp plates 258 and 259 which are drawn together by means of a pair of threaded rods 260 passing through respective holes in plates 258 and 259 and having nuts 262 which are tightened against plates 258 and 259. The C-shaped stacks of laminations 212 and 254 are placed in facing flat-wise abutment as shown in FIG. 24 so that the generally semi-circular air-gap spaces 264 (FIG. 23) which were formed when the stacks were bent to their C-shaped configuration, together form a generally step-wise cylindrical air-gap 266. A possible alternative to forming air-gap 266 having a cylindrical shape would be to cut strips 204 which are chamfered on one corner so that when they are bent to the C-shaped configuration and placed in facing flat-wise abutment, the air-gap 266 will be generally conical in shape.

End blocks 244 and 245 are then removed and the core sections 212 and 254 comprising the C-shaped stacks of laminations 204 are fastened to each other by fusion welding the top sections to each other. As shown in FIG. 26, the facing surfaces of core sections 212 and 254 are welded at points 268 and 269 at the abutting edges thereof remote from air-gap 266, and at the inner strip segments on lateral sides of each pole face at the points designated by the numeral 270. On one side of each of the pole pieces continuous welds 272 and 274 are formed laterally across each pole piece. At this point, the core 276 may be stress relieved as by annealing. Clamp 256 may now be removed because the core 276 is self-retaining by virtue of welds 270, 272 and 274. If desired, the portion 208 of core 276 immediately surrounding pole faces 278 and 280 may be coated with an epoxy sealant and bonding agent. Air-gap 266 is then machined out to form the desired conical shape as discussed in connection with the previous two embodiments.

As mentioned previously, the advantage to the method just described is that there is substantially less material waste, which would otherwise occur when the air-gap 266 is machined. Because the air-gap is nearly completely formed prior to machining, only a relatively small amount of additional core material need be removed to achieve the desired conical shape.

From the foregoing description, it will be apparent that the method of forming magnetic cores provided herein fully satisfies the objects and aims set forth above. While the invention has been described in conjunction with specific embodiments thereof, many alternatives, modifications and variations will suggest themselves to persons skilled in the art in view of the foregoing description. For example, it will be apparent that the methods described herein may be practiced in a multiple-step automated process. It will be further apparent that, while the invention has been disclosed and exemplified in connection with a refrigeration system, the invention is equally applicable to other types of refrigerant systems and that many principles of the invention may be applied generally to gas pumps, such as air compressors or the like. Accordingly, the invention is intended to embrace all such alternatives, modifications and variations as fall within the spirit and scope of the appended claims.

I claim:

1. A method of making a magnetic core for a reciprocating electric motor comprising the steps of:

stacking a plurality of strips of magnetic material wherein the respective strips are of diverse lengths and are stacked such that the strips are in order of decreasing length, in a first direction, bending the stack of strips in said first direction around the shortest length strip to a generally C-sahped configuration, stacking a second plurality of strips of magnetic material wherein the strips are of diverse lengths and are stacked such that they are in order of decreasing lengths in a second direction, bending the second mentioned stack of strips in said second direction into a generally C-shaped configuration around the shortest length strip thereof, each of said C-shaped stacks having an air-gap space defined by the end edges of the respective strips, said air-gap spaces being generally semi-circular in cross-section, positioning said first and second C-shaped stacks in flatwise abutment on a common plane such that their respective air-gap spaces are in mutually facing relationship and together form an air-gap, and fastening said C-shaped stacks tightly together in their flatwise abutment position.

2. The method set forth in claim 1 wherein said air-gap formed by said facing air-gap spaces is generally cylindrical in shape, and including the step of machining said air-gap to form said cylindrical air-gap into a conical shape.

3. The method set forth in claim 1 wherein said stacks of strips are bent around an oblong mandrel during their formation into said C-shaped configuration.

4. The method set forth in claim 1 including clamping said C-shaped stacks together in a fixture to position them in said flatwise abutment, and then welding said stacks together.

5. The method set forth in claim 4 wherein said C-shaped stacks are strip welded so as to prevent them from straightening out.

6. The method set forth in claim 1 including the step of stress relieving said C-shaped stacks.

7. The method set forth in claim 1 wherein said air-gap formed by said facing air-gaped spaces is generally circular in cross-section on a plane perpendicular to the axis of reciprocation.

* * * * *

UNITED STATES PATENT AND TRADEMARK OFFICE
CERTIFICATE OF CORRECTION

PATENT NO. : 4,198,743
DATED : April 22, 1980
INVENTOR(S) : Richard A. Stuber

It is certified that error appears in the above-identified patent and that said Letters Patent are hereby corrected as shown below:

Col. 8, line 33, "degres" should be -- degrees --.

Col. 9, line 13, "a - 0" should be -- a = 0 --.

Col. 12, line 29, "plates" should be -- planes --.

Claim 1, Col. 17, line 15, "sahped" should be -- shaped --.

Claim 1, Col. 17, line 19, "lengths" should be -- length --.

Signed and Sealed this

First Day of July 1980

[SEAL]

Attest:

SIDNEY A. DIAMOND

Attesting Officer

Commissioner of Patents and Trademarks